Aug. 18, 1925.

H. O. HEM

LEVER MECHANISM

Filed Feb. 25, 1920

1,549,977

Inventor
Halvor O. Hem
By George R. Frye
Attorney

Patented Aug. 18, 1925.

1,549,977

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

LEVER MECHANISM.

Application filed February 25, 1920. Serial No. 361,254.

*To all whom it may concern:*

Be it known that I, HALVOR O. HEM, a citizen of the United States, residing at Toledo, in the county of Lucas and State of Ohio, have invented certain new and useful Improvements in Lever Mechanism, of which the following is a specification.

This invention relates to lever mechanism, and particularly to improved connections between bearing-carrying members and pivot-carrying members, and I have illustrated the invention as embodied in the platform lever mechanism of a platform scale, for use in which it is particularly adapted, though it is to be understood that it is also adapted for use in other mechanism having pivoted parts and that I contemplate its employment wherever applicable.

In scales as commonly constructed, the platform levers are provided with knife edge pivots which project rigidly from the sides of the levers, the fulcrum pivots having the knife edges turned downwardly and resting upon bearings and the load pivots having their knife edges turned upwardly and rockably supporting bearings to which the platform is connected. In order that the parts may be kept in proper relation, it is necessary that the fulcrum pivots be prevented from shifting on their bearings, and it has been customary heretofore to prevent such shifting by forming the bearings with grooves to receive the knife edges of the pivots. It is difficult to get such grooves absolutely perpendicular to the plane of movement of the lever and absolutely parallel and to absolutely align the corresponding pivots on opposite sides of the lever. My invention has for its principal object the provision of a connection in which the bearings and pivots are held in proper relation without the groove.

Other objects and advantages will be apparent from the following description, in which reference is had to the accompanying drawings illustrating a preferred embodiment of my invention and wherein similar reference numerals designate similar parts throughout the several views.

In the drawings:—

Figure 1:
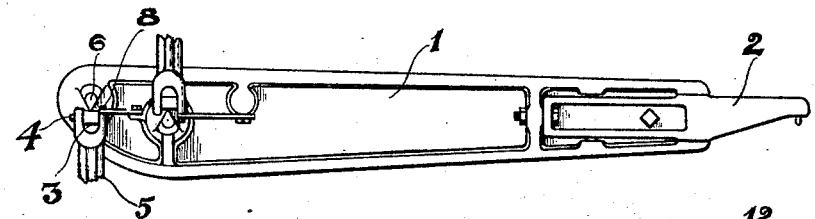
Figure 1 is a side elevation of a lever showing my invention as applied to the fulcrum and load pivots thereof.
Figure 3:
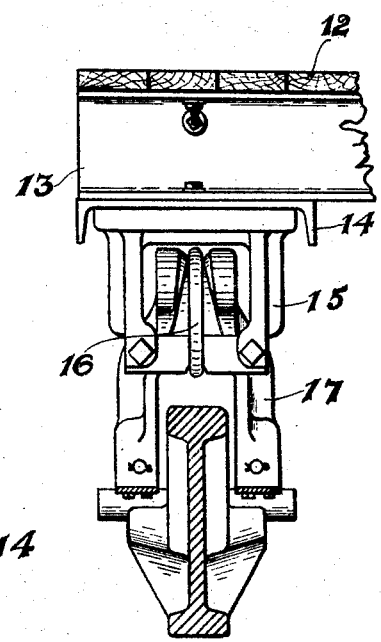
Figure 3 is a sectional view taken substantially as indicated by the line 3—3 of Figure 2.
Figure 2:
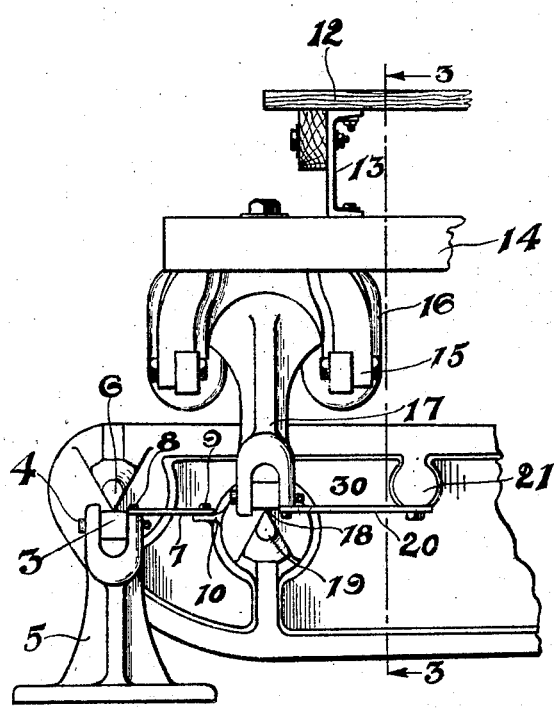
Figure 2 is a fragmentary enlarged detail elevation showing my invention.

Referring to the drawings in detail, the lever 1 is shown as provided with an adjustable nose iron 2 through which it is connected to other parts of the lever mechanism not shown. The fulcrum bearings 3 are pivotally supported by means of pins 4 in the upper ends of fulcrum stands 5, it being understood that there is a bearing 3 on each side of the lever 1. The upper sides of the bearings 3 which are engaged by the fulcrum pivots 6 are perfectly flat, and since the knife edges of the pivots 6 are straight and the bearings are pivoted, they will automatically assume positions in which the knife edges are in contact with the bearings throughout their length.

In order to prevent the pivots 6 from shifting on the bearings 3, I have connected the lever and fulcrum stand by means of flexible strips 7. Any suitable means may be employed to connect the strip to the fulcrum stand and to the lever. As shown, a strip 7 is located on each side of the lever with its central horizontal plane substantially coincident with the plane of the upper surface of the bearing 3 in which the knife edge of the pivot 6 lies, and is secured at one end to the fulcrum stand by means of fastening screws, its other end being secured by means of screws to a lug 10 on the lever 1.

As the lever rocks on its fulcrum during a weighing operation, the strip 7 will be very slightly flexed. The movement of the lever is so small that the flexure will be almost imperceptible and the pivot edge will not be moved on the surface of the bearing 3.

The platform 12 is secured to channel iron joists 13 resting upon girders 14 which in turn are secured upon brackets 15, the brackets 15 being supported by links 16 which are swung from laterally-extending portions of saddle blocks 17. The saddle blocks straddle the lever 1 and have pivoted bearings mounted in their lower ends to rest upon the upturned knife edges of lever load pivots 19. The bearing faces of the bearings 18, like those of the bearings 3, are perfectly plane, and in order to prevent shifting of the bearings 18 on the pivots 19 the resilient members 20, similar in structure and function to the members 7, are secured to the saddle blocks 17 and to laterally-extending lugs 21 projecting from the sides of the lever. The flexure of the members 20 due to the slight movement of the lever 1 during weighing operations is so slight as to offer no appreciable resistance to the movement of the lever and to cause no sliding of the bearing 18 on the pivot 19. Owing to the fact that the usual groove is omitted from the bearings, they are much easier to machine and less subject to breakage than grooved bearings of the type commonly employed. The strains on the pivot edges caused by the bottoms of the grooves being slightly out of alignment or out of parallel, and which often result in clipping the edges of the pivots, are also avoided by my construction, while the friction resulting from movement of the lever is very much less and there are no upturned open grooves in the fulcrum bearings to catch dirt.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In mechanism of the class described, in combination, a bearing, a knife edge pivot engaging therewith, and a tying connection between said bearing and said pivot to prevent relative shifting movement thereof.

2. In mechanism of the class described, in combination, a bearing, a knife edge pivot engaging therewith, and connections between said bearing and said pivot to prevent relative shifting movement thereof, said connections including a flexible strip.

3. In mechanism of the class described, in combination, a bearing, a bearing-carrying member, a pivot engaging said bearing, a pivot-carrying member, and a flexible connection between said bearing-carrying member and said pivot-carrying member to prevent translation of said pivot relative to said bearing.

4. In mechanism of the class described, in combination, a bearing, a bearing-carrying member, a pivot engaging said bearing, a pivot-carrying member, and a flexible strip secured to said bearing-carrying member and said pivot-carrying member.

5. In mechanism of the class described, in combination, a bearing having a plane bearing face, a knife edge pivot engaging said face, and means for preventing relative shifting of said pivot and bearing.

6. In mechanism of the class described, in combination, a bearing having a plane bearing face, a knife edge pivot engaging said face, and means including a flexible tie member for preventing relative shifting of said pivot and bearing.

7. In mechanism of the class described, in combination, a lever, a knife edge pivot carried thereby, a bearing having a flat face engaging said pivot, a bearing-carrying member, and a resilient strip secured to said lever and said bearing-carrying member.

8. In mechanism of the class described, in combination, a lever, a knife edge pivot carried thereby, a fulcrum stand, a bearing carried thereby and supporting said pivot, and a flexible strip secured to said lever and said fulcrum stand.

9. In mechanism of the class described, in combination, a lever, a knife edge pivot carried thereby, a fulcrum stand, a bearing carried by said stand, said bearing having a flat bearing face upon which the knife edge of said pivot rests, and a flexible strip lying substantially in the plane of said flat bearing face and secured to said lever and said fulcrum stand.

10. In mechanism of the class described, in combination, a lever, a knife edge load pivot thereon, a load bearing resting on said pivot, and means to prevent said bearing from shifting on said pivot, including a resilient strip secured to said lever and connected to said bearing.

11. In mechanism of the class described, in combination, a lever, a knife edge load pivot carried thereby, a platform-supporting member, a bearing carried thereby, said bearing having a flat face resting upon the knife edge of said pivot, and a resilient strip secured to said lever and said platform-supporting member.

12. In mechanism of the class described, in combination, a lever having knife edge fulcrum and load pivots, a fulcrum stand, a flat faced bearing carried by said fulcrum stand for supporting the fulcrum pivot of said lever, a resilient strip connecting said lever and said fulcrum stand, a platform-supporting member, a flat faced bearing carried by said platform-supporting member and resting upon the load pivot of said lever, and a resilient strip connecting said lever and said platform-supporting member.

HALVOR O. HEM.